United States Patent [19]

Slaton

[11] 4,204,280
[45] May 20, 1980

[54] UNDERWATER SIGNAL DISCRIMINATION SYSTEM

[75] Inventor: Jack H. Slaton, Arcadia, Calif.

[73] Assignee: The United States of America as represented by the Secretary of the Navy, Washington, D.C.

[21] Appl. No.: 239,384

[22] Filed: Nov. 21, 1962

[51] Int. Cl.² ............................................. G01S 9/66
[52] U.S. Cl. .................................. 367/95; 367/98; 367/901; 367/904
[58] Field of Search ...................... 343/17.1; 340/1, 3, 340/5 S, 5, 6, 16; 181/0.51, 0.55; 114/23; 325/21, 42, 65, 313, 323, 379, 388, 473, 477; 367/95, 98, 901, 904

[56] References Cited

U.S. PATENT DOCUMENTS

| | | | |
|---|---|---|---|
| 2,431,854 | 12/1947 | Wood | 367/97 |
| 3,021,807 | 2/1962 | Stedman | 367/96 |

Primary Examiner—Richard A. Farley
Attorney, Agent, or Firm—Q. B. Warner; V. C. Muller; P. H. Firsht

EXEMPLARY CLAIM

1. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occurring at an unpredictable frequency within a comparatively wide frequency band substantially centered upon the reverberation mean frequency, a receiver circuit for effecting discrimination of target echoes from reverberation, said receiver circuit comprising: first filter means having a rejection notch characteristic centered upon the reverberation mean frequency, and of comparatively limited bandwidth substantially matching that of the major energy portion of said reverberation, for converting said receiver signal to a modified signal with strong attenuation of reverberation in only a correspondingly limited central portion of its frequency spectrum and without substantially affecting target echoes occurring at frequencies outside of said rejection notch; demodulator means for deriving from said modified signal a unipolar signal corresponding to the modulation envelope of said modified signal; and second filter means having a bandpass response characteristic with upper cutoff frequency substantially equal to half said limited bandwidth of the first filter means rejection notch, for isolating, from said unipolar signal, only such signal pulses as correspond to target echoes.

13 Claims, 10 Drawing Figures

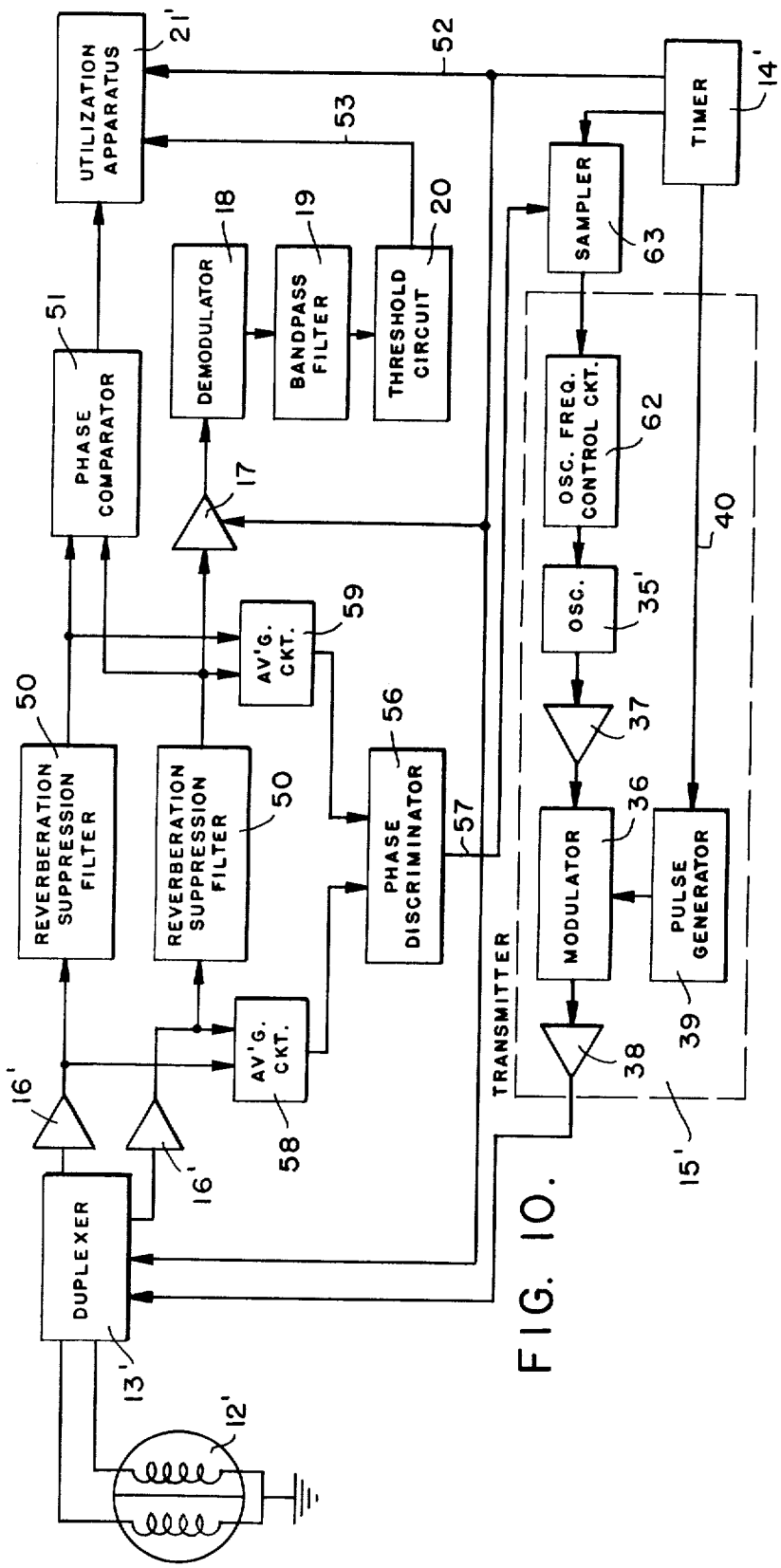

4,204,280

UNDERWATER SIGNAL DISCRIMINATION SYSTEM

The invention described herein may be manufactured and used by or for the Government of the United States of America for governmental purposes without the payment of any royalties thereon or therefor.

The present invention relates generally to systems of the underwater echo-ranging type for detection of object presence and direction, and more particularly concerns such a system providing improved performance under reverberation-limited detection conditions. Lending itself to comparatively compact implementation, the invention is of special utility and directly intended for use in torpedoes and will therefore be described principally with reference to such environment.

Transmission of search pulses of acoustic energy in accordance with an echo-ranging technique gives rise not only to target echoes, as desired, but also to reverberation which is received at varying intensity levels in the listening periods between search pulse transmission instants, and which is the dominant and troublesome component of background signals during what is correspondingly referred to as a reverberation-limited detection period following each transmission instant. As received during each listening period, the average amplitude of reverberation decays following each search pulse transmission instant, but not necessarily monotonically; superimposed upon the reverberation decay curve is an amplitude modulation envelope usually comprising pulses having approximately the same characteristics as the transmitted pulse. The term "reverberation" is therefore here to be understood as not confined simply to so-called "volume-reverberation" (search pulse energy reflection from myriad small scatterers distributed throughout the region of seawater insonified by a search pulse), but as generalized to further embrace spurious pulses which may arise, for example, by reflection of search pulse energy from the seawater surface, or the bottom, or from a thermocline (a layer of seawater demarcated by its comparatively large thermal gradient) or from any other comparatively abrupt discontinuity within the transmission medium.

Echo-ranging target detection apparatus as employed in homing torpedoes must function to effect detection of target echoes in a manner to provide a high degree of freedom from so-called "false-alarm" response to background signals. Such freedom from false-alarm response is achieved by use of an amplifier of say TVG (time-variable-gain) or RCG (reverberation-controlled-gain) type in association with a demodulator and a threshold type of target detection circuit; the amplifier tends to maintain its average output background signal at substantially constant level despite extreme variations of the input background signal intensity, and the target detection threshold circuit is set to be unresponsive to the largest expected output background signal pulse and correspondingly to detect only those target echo signals exceeding the average output background signal by a predetermined margin. While such an arrangement thus satisfies the basic requirement of substantially eliminating false-alarm response, it will be readily understood that is engenders discontinuity (occasional loss) of target detection to an extent dependent, basically, upon the effectiveness with which the echo ranging apparatus can discriminate target echoes from background signals, and upon the attendant minimum S/N (target echo signal-to-noise) ratio at which reliable detection of the target echoes can be accomplished. Frequent discontinuity of target detection, characteristic of prior art echo-ranging systems, severely reduces the kill probability of a homing torpedo, particularly in the case of a torpedo operating at comparatively high speed in the terminal phase of torpedo homing (attack) action against an evasive target.

It is therefore an object of the present invention to provide a comparatively compact echo-ranging apparatus having significantly improved capabilities as to the detection of targets under reverberation-limited conditions.

Another object of the present invention is to provide an echo-ranging apparatus which effects target detection under heretofore unfavorable S/N ratios.

Another object of this invention is to provide an echo-ranging apparatus yielding improvements in discrimination of target echoes from spurious echoes.

Another object of the invention is to provide an echo-ranging apparatus which can effect target recognition, during reverberation-limited periods of operation, under heretofore unfavorable conditions of target aspect and relative velocity.

A further object of the invention is to provide an echo-ranging apparatus which can effect target detection with significantly greater constancy and reliability under reverberation-limited target detection conditions.

These and other objects and attendant advantages of the present invention will be readily appreciated as the invention becomes better understood by reference to the following detailed description in connection with the accompanying drawing wherein.

Figure 5:
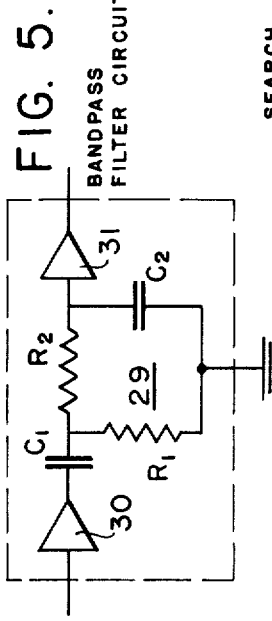
Figure 6:
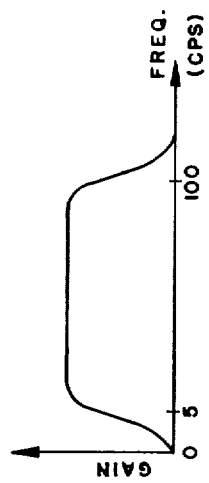

FIG. 5 details an exemplary form of bandpass filter circuit for providing post-demodulation frequency separation in the novel echo-ranging system;

FIG. 6 depicts the transfer characteristic presented by the FIG. 5 bandpass filter circuit;

FIG. 7 illustrates in generalized block diagram form the organization of a shaped-pulse type of transmitter;

FIG. 8 depicts a preferred type of shaped search-pulse configuration (full-line curve) in comparison to the usual rectangular pulse;

FIG. 9 illustrates the improved frequency spectrum (full-line curve) corresponding to the shaped search-pulse shown in FIG. 8, in comparison to the usual pulse frequency spectrum; and FIG. 10 details, in block diagram form, the organization of another embodiment of the invention.

It is to be understood that each of the individual units in the exemplary embodiments of the invention illustrated in block diagram forms in FIGS. 1 and 10 of the drawing, apart from their association in novel combinations, and apart from being provided with frequency characteristics specifically related as in later described manner, may separately be of well-known types employing conventional circuitry. It will also be understood that the echo-ranging apparatus is carried by a torpedo or other watercraft and that the transducer is mounted to "look" forwardly along the watercraft propulsion axis, in accordance with conventional practice.

Figure 1:
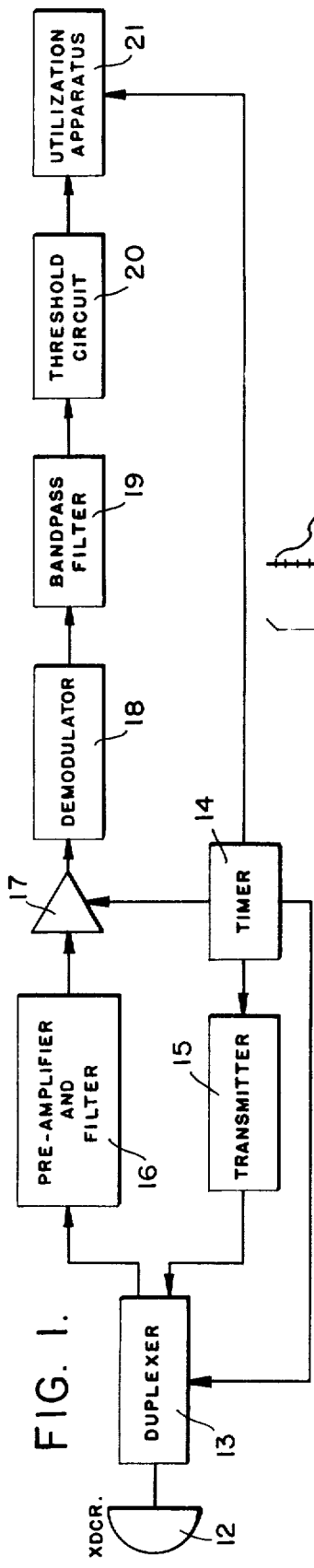
FIG. 1 illustrates, in a simplified and generalized block diagram form, the organization of an exemplary echo-ranging system embodying the invention.

The embodiment shown in FIG. 1 concerns an echo-ranging system which is generalized for purposes of explaining principles of the present invention, and in which transducer 12 is therefore of the single channel type for simply detection of target presence, rather than sectioned (as in the FIG. 10 embodiment) to provide multiple channels to additionally enable accurate determination of target direction. Briefly describing in a general manner the several units and their organization or function in the FIG. 1 embodiment, duplexer 13 enables use of transducer 12, in well known and conventional manner, both for transmission of search-pulses and for reception of resultant echo-pulses. Under control of timer 14, transmitter 15 repetitively generates search-pulses of say 40 ms (millisecond) duration at intervals of say 1.5 seconds and at a carrier frequency of say 30 kc/s (kilocycles per second), which pulses are applied to transducer 12 through duplexer 13. The signals received by transducer 12 during the listening periods following transmission of search-pulses are applied through the duplexer 13 to the receiver combination which in this instance comprises the pre-amplifier and filter unit 16, amplifier unit 17 (preferably including an RCG type amplifier), demodulator 18, post-demodulation bandpass filter unit 19 and target detection threshold circuit 20. The utilization apparatus 21 may here be of any type normally employed in connection with detected target echoes, for example in this generalized instance simply an oscilloscope including associated sweep circuits for indication of targets on a range scale. Timer 14 also here functions to supply pulses to the TVG or RCG amplifier in amplifier unit 17 for gain-control reset purposes, likewise to duplexer 13 if it is of type so requiring, and to utilization apparatus 20 for range sweep triggering in the case of an oscilloscope, or for any other purpose as appropriate in any particular utilization apparatus.

Figure 2:
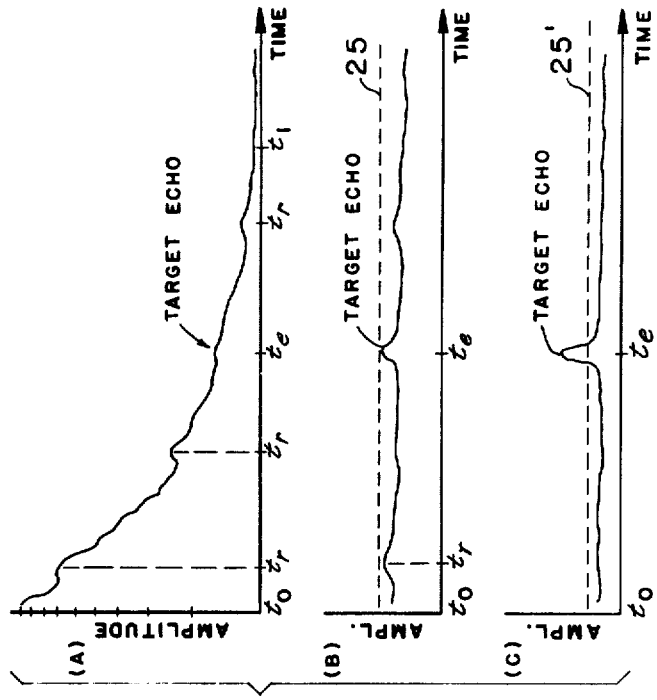
FIG. 2 depicts (A) typical amplitude characteristics of a signal received during reverberation-limited operation, (B) a threshold circuit input signal as derived from the received signal in accordance with the prior art, and (C) a threshold circuit input signal as derived from the received signal in accordance with the present invention.
Figure 3:
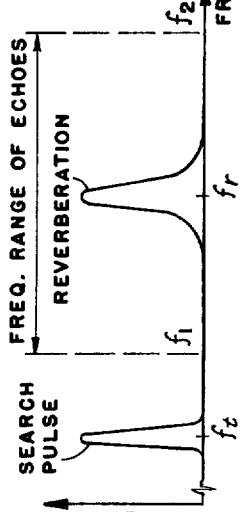
FIG. 3 depicts the frequency spectra of a search-pulse and of resultant reverberation, relative to the frequency band in which target echoes can appear.

Next considering various characteristics of the composite signal (true target echoes, and background signals comprising reverberation containing spurious echo pulses) received by signal processing circuits of the receiver during a reverberation-limited period of echo-ranging system operation, graph A of FIG. 2 illustrates the amplitude envelope characteristic of such a composite signal, the intensity variations therein which occur during intervals shorter than say about 1 ms here being shown as averaged or smoothed (as would inherently be effected by the input circuits) without significantly affecting the greater duration true target and spurious echo pulses. The indicated search-pulse transmission instant $t_o$ serves as a time-reference and marks initiation of a listening period; $t_r$ marks several instants at which reverberation increases markedly in pulse manner; $t_e$ marks an instant at which a comparatively weak target echo is received under ordinarily unfavorable S/N ratio; and $t_l$ marks, approximately, termination of the reverberation-limited period which may be of a duration in the order of one second. The signal amplitudes are to be understood as plotted to a logarithmic scale to accommodate the very large range of intensity variations. As indicated, reverberation is typically of extremely high intensity immediately following the search-pulse transmission instant $t_o$ and, except for spurious pulses, its smoothed amplitude curve decays approximately exponentially to substantially zero value at about the instant $t_l$ at which therefore, so-called "self-noise" becomes the major background signal component. Reverberation intensity may also vary considerably from one listening period to another in largely unpredictable manner since it is strongly affected by the particular geometry of the acoustic path and by the particular condition of the seawater region encountered in a given listening period. Target echoes likewise are variable in amplitude, dependent upon a number of variable factors including target range, target aspect, and target direction relative to the transmit and receive field patterns. Frequency relationships of the search-pulse, reverberation, and of the practical operating band in which target echoes can occur, resulting from the Doppler-shift effects associated with motion of the target and of the watercraft carrying the echo-ranging apparatus, are shown in the frequency spectrum plot given in FIG. 3; the mean reverberation frequency $f_r$ is greater than the search-pulse frequency $f_t$ because of the Doppler effect associated with watercraft motion toward the reverberation sources; the particular frequency at which a target echo will occur in the indicated range extending between the lower and upper frequencies $f_1$ and $f_2$, respectively, is of course in each instance dependent upon the sense and magnitude of the target velocity relative to the watercraft; as indicated, the major reverberation frequencies occupy a comparatively small portion of the frequency band in which target echoes can appear, but reverberation presents somewhat greater frequency spread than do the search-pulses and the roughly similar target echo-pulses. It may also be noted at this point that because of the compressed frequency scale and for simplicity of illustration, the FIG. 3 plot presents the overall envelope of the reverberation energy amplitudes rather than the many amplitude loops within the frequency spectrum.

The invention involves the novel concept of attenuating (by means of a reverberation suppression filter having a rejection-notch type of transfer characteristic) only those signals (principally reverberation) received in a narrow frequency band corresponding to a limited central portion of the reverberation frequency spectrum, in various combinations with certain other operations, specifically, transmission of search-pulses shaped to reduce reverberation frequency spread to a practical minimum, ODN (own-doppler-nullification) means for providing and maintaining accurate alignment of the mean reverberation frequency and the rejection-notch characteristic of the reverberation suppression filter, amplification in accordance with TVG or RCG technique, demodulation which transforms the filtered signal to a unipolar signal corresponding to the modulation waveform, post-demodulation filtering which, as will appear, effects an appreciable further degree of discrimination against remaining reverberation in favor of the demodulated true target echoes, and a target detection threshold circuit which prevents false-alarm response. The end function of the signal processing circuitry is to provide significantly improved capabilities in discrimination of target echoes from reverberation, enabling detection of target echoes even when received at ordinarily unfavorable S/N ratios, correspondingly reducing discontinuity of target detection and, in the case of a homing torpedo, greatly increasing target kill probability.

The considerable improvement in target echo discrimination and detection afforded by apparatus in accordance with the present invention may be pictured in a general manner by comparison of graphs B and C of FIG. 2 which are drawn to the same time scale and in alignment with graph A. Referenced to the same composite signal input including spurious pulses at $t_r$ and a weak target echo at $t_e$ as shown in graph A of FIG. 2, graphs B and C respectively illustrate threshold circuit input signals as derived by use of prior art technique and, in comparison, as derived by use of apparatus in accordance with the present invention. In the prior art apparatus, the general level of background noise in the threshold circuit input signal, and the presence of spurious pulses as indicated at instants $t_r$, force setting of the threshold detection level to the relative value indicated at 25 in graph B in order to prevent false-alarm response, thus resulting in loss of detection of such target echoes as at $t_e$. The present invention, however, effects further suppression of reverberation and of spurious pulses therein in favor of moving-target echoes, as indicated by the threshold circuit input signal and conditions illustrated in graph C, wherein 25' designates the threshold level which enables detection of the discriminated target echo at $t_e$ while excluding response to background signals.

Figure 4:
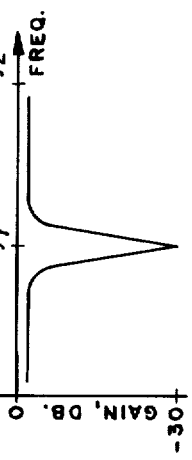
FIG. 4 depicts the type of attenuation characteristics presented by the reverberation suppression filters employed in the novel echo-ranging system.

Referring again to the FIG. 1 embodiment to complete the description thereof, the reverberation suppression filter (not shown), employed in the pre-amplifier and filter unit 16, provides a rejection-notch (band-elimination) transfer characteristic as illustrated in FIG. 4, and for such purpose the filter may be of RLC bridged-T network or any other suitable type. For ease of comparison as to the relationship between the rejection-notch characteristic and the reverberation frequency spectrum, FIGS. 3 and 4 are drawn to the same frequency scale and are shown in alignment as to mean reverberation frequency and rejection-notch center-frequency. The reverberation suppression filter rejection-notch is centered upon the mean reverberation frequency $f_r$ and is of sufficiently narrow bandwidth, say 200 c/s (cycles per second) at the 3 db down points, to encompass only the major energy portion of the reverberation frequency spectrum and to thus have but small effect upon echoes exhibiting sufficient Doppler frequency shift relative to the mean reverberation frequency, specifically, upon echoes arising from targets moving at relative speeds greater than say about 2 knots. The pre-amplifier and filter unit 16 preferably further includes a bandpass filter (not shown) designed to strongly attenuate or exclude signals outside of the band of frequencies ($f_1$ to $f_2$) in which target echoes can appear, which filter likewise may be of entirely conventional type. Amplifier unit 17 includes a variable-gain amplifier, as mentioned earlier, preferably of RCG type, operating in usual manner to provide a substantially constant level of output signal (except for pulse modulation) despite large variations in reverberation from one listening period to another and despite the extreme variation in reverberation amplitude during each listening period.

It should be noted at this point that the reverberation suppression filter does not exclude all of the reverberation energy (nor does the disclosed novel system eliminate or prevent response to very strong echoes arising from hovering or substantially motionless targets) but rather, as indicated by the characteristic given in FIG. 4, provides varying attenuation over the reverberation frequency spectrum; greatest attenuation (in this instance about 30 db) is provided at the mean reverberation frequency, and progressively lesser attenuation at other reverberation frequencies in accordance with their deviation from the mean reverberation frequency. Further, while the reverberation suppression filter strongly attenuates its input reverberation signal, its output reverberation signal still decays during each listening period in much the same manner, as indicated generally in the FIG. 2A graph, and likewise still carries the spurious pulse modulation, but the pulse envelopes are of modified character as to major frequency content as a result of the varying attenuation imposed by the filter over the reverberation frequency spectrum; the latter circumstance is exploited by the post-demodulation bandpass filter unit 19 to effect further discrimination of target echoes as will appear.

Demodulator 18 operates in usual manner to effect rectification of the ultrasonic signal delivered by the amplifier unit 17, yielding a unipolar signal (such as indicated in the FIG. 2B graph) including spurious pulses having waveforms as modified by the action of the reverberation suppression filter. Threshold circuit 20 simply sets a detection threshold level, as indicated at 25', to prevent false-alarm response of utilization apparatus 21 as explained earlier. Post-demodulation bandpass filter unit 19 basically comprises any suitable network designed to exclude or strongly attenuate demodulator output signal components at frequencies greater than about half the bandwidth of the reverberation suppression filter, in this instance at frequencies greater than about 100 c/s. The bandpass filter network preferably also provides attenuation at extremely low frequencies, ranging downward from say about 5 c/s. The sharply-tuned reverberation suppression filter employed in the pre-amplifier and filter unit 16 severely attenuates reverberation modulation frequencies ranging downward from about 100 c/s; the pulse envelopes of echoes occurring at frequencies greater than minimum Doppler frequency, however, are affected to negligible extent, and characteristically exhibit component frequencies ranging downward from about 50 c/s. Since the demodulator output reverberation signal thus consists mainly of components at frequencies greater than about 100 c/s, also at frequencies between zero and about 5 c/s arising from the comparatively slow decay referred to earlier, the bandpass filter network operates to effect further attenuation of reverberation energy while passing most of the true target echo pulse energy, thus providing further improvement as to discrimination of target echoes from reverberation and spurious pulses therein. By way of example, the bandpass filter network in the post-demodulation bandpass filter unit 19 may be of RC type as detailed at 29 in FIG. 5, providing a transfer characteristic as depicted in FIG. 6 in which, sacrificing sharp cut-off sides in favor of circuit simplicity, the end-portions slope at about 6 db/octave, the 3 db-down points occurring at about 5 c/s and 100 c/s as indicated. The illustrated network 29 employs capacitors $C_1$ and $C_2$ and resistors $R_1$ and $R_2$ as shown, in a typical instance having values as follows:

$C_1$—50 microfarads
$C_2$—0.27 microfarad
$R_1$—600 ohms
$R_2$—6000 ohms

The post-demodulation bandpass filter unit 19 preferably further includes buffer amplifiers as indicated in FIG. 5 at 30 and 31.

While the echo-ranging system as thus far described with reference to the FIG. 1 embodiment is fully operative to yield significantly improved target detection performance under reverberation-limited conditions, further improvement in the echo-ranging system is afforded by providing ODN circuitry for maintaining alignment of the mean reverberation frequency and the rejection-notch center-frequency, and by providing a transmitter designed to generate suitably-shaped search-pulses for effecting considerable reduction of reverberation frequency spread with consequent improvement in the S/N ratio. For the purpose of including ODN in conventional manner, the receiver of the FIG. 1 embodiment may be of heterodyning type, in which instance the unit 16 further comprises local oscillator, mixer and intermediate frequency amplifier stages, together with frequency discriminator and oscillator control means responsive to reverberation sampled early in each listening period to continually adjust the oscillator in a manner to maintain the reverberation, at intermediate frequency, centered in the reverberation suppression filter rejection-notch. Similarly, the shaped search-pulse transmitter may take the form indicated at 15 in FIG. 7, wherein a continuous signal at ultrasonic carrier frequency as generated by oscillator 35 is applied to modulator 36 through buffer amplifier 37; modulator 36 is here of a type which enables excitation of power amplifier 38 and varies its output in response to and in accordance with a shaped control pulse as delivered by shaped-pulse generator 39 when triggered by timer 14 via lead 40. By providing a shaped control pulse and correspondingly a search-pulse envelope of rounded configuration as indicated in FIG. 8 by the full line curve 44, in contrast to the usual rectangular configuration shown by the broken-line curve 45, pulse energy is confined to a smaller band of component frequencies as indicated by comparison of the frequency spectra of these pulses as given, respectively, by the full-line and broken-line curves 44' and 45' in FIG. 9, with a correspondingly greater percentage of the resultant frequency-distributed reverberation falling within the reverberation suppression filter rejection-notch.

Additional novel combinations afforded by the present invention will be understood by reference to the embodiment illustrated in FIG. 10, such combinations involving an ODN circuit which operates at ultrasonic carrier frequency rather than requiring heterodyning circuitry, and in which the reverberation suppression filter functions not only as already described, but also serves as a frequency-deviation sensing element in the ODN circuit.

In greater detail, transducer 12' in this instance is sectioned as indicated to provide dual channels for derivation of target azimuth direction signals by use of a phase comparison technique. Duplexer 13' functions as before under control of timer 14' to enable use of transducer 12' for both transmission and reception. Receiver units 16' in the identical dual receiver channels are similar to the preamplifier and filter unit 16 of the FIG. 1 embodiment but in this instance each unit 16' includes only preamplifiers and a bandpass filter network, the reverberation suppression filter in each channel being separately indicated at 50. Phase comparator 51 includes limiter stages and operates to provide a DC control voltage of polarity and magnitude corresponding to the target azimuthal direction relative to the watercraft or transducer axis, in accordance with known practice. Utilization apparatus 21' in this instance represents torpedo steering apparatus, supplied by timer 14' with reset pulses via lead 52, and responsive to the steering control voltage (phase comparator output voltage) only when gated by a detected echo pulse delivered by threshold circuit 20 via lead 53, development of such a gating pulse amounting to target detection or recognition in accordance with principles of the invention as already described with reference to the FIG. 1 embodiment.

Continuing with reference to the FIG. 10 embodiment, target detection or recognition (as distinguished from direction determination) is again here effected by use of an amplifier unit 17 (in which the RCG amplifier is supplied with gain control reset pulses by timer 14'), demodulator unit 18, post-demodulation bandpass filter unit 19, and target detection threshold circuit 20, these being employed in but one of the dual receiver channels as shown.

The novel ODN system, greatly improved as to compactness and effectiveness, is provided by employing a phase-shift characteristic of the reverberation suppression filter in derivation of a reverberation frequency error signal (corresponding to deviation of mean reverberation frequency from rejection-notch center-frequency), yielding a higher correction sensitivity, and eliminating the need for a frequency discriminator and the associated severe problem of providing two frequency-sensitive circuits able to maintain very critical alignment over long periods of time. Any drift of the reverberation suppression filter rejection-notch characteristic is automatically compensated since the filter itself serves as the error detector within the ODN loop. Further, the reverberation frequency error signal, in the improved ODN system, is employed to adjust the carrier frequency, rather than the heterodyned reverberation frequency, in a manner forcing reverberation into alignment with the rejection-notch center-frequency, thus eliminating the need for providing a heterodyning system (including local oscillator, mixer and intermediate frequency amplifier stages), which heterodyning system moreover would involve still greater apparatus complexity in a multiple channel receiver. In the illustrated instance, both reverberation suppression filters are employed in derivation of the reverberation frequency error signal, since it presently appears advantageous to average the possibly slightly differing phase characteristics of the two filters rather than to employ only one of the filters as the reverberation frequency error detector in the controlling loop. Phase discriminator 56 includes limiter stages and operates to provide at lead 57 a DC error signal of magnitude and polarity corresponding to the phase difference between the averaged input reverberation signals and the averaged output reverberation signals of reverberation suppression filters 50, as supplied by the averaging circuits 58 and 59, respectively. While the input reverberation averaging circuit 58 is here shown as receiving its reverberation signals from receiver units 16', it may instead be supplied with the reverberation signals at lower levels from earlier points. Transmitter 15' may be basically the same as that described with reference to FIG. 7, except for employment of an oscillator 35' adapted to be controlled as to frequency by the oscillator its frequency control circuit 62. The reverberation error signal delivered by phase detector 56 at lead 57 is sampled early in each listening period, here shown as effected by sampler 63 which may simply be switch means controlled by timer 14' to apply the reverberation error signal for say a few milliseconds to the oscillator frequency control circuit 62. The latter circuit may be of any conventional type adapted to correct and hold the operating frequency of an associated oscillator to a corrected value, in response to an error signal. In this instance, oscillator frequency control circuit 62 operates to control oscillator 35' (and thus to control the carrier frequency of the search pulses) in response to the the reverberation error signal, in a manner resulting in the bringing and maintaining of the mean reverberation frequency into substantial alignment with the reverberation suppression filter rejection-notch.

It will be appreciated from the foregoing that the invention concerns an echo-ranging system in which target detection capability under reverberation-limited conditions is significantly improved by novel use of reverberation suppression filter means in various combinations with search-pulse shaping, post-demodulation filtering and ODN circuits, wherein the search-pulse shaping minimizes reverberation frequency spread and thus increases the effectiveness of the reverberation suppression filter, wherein post-demodulation filtering specifically matched to the reverberation suppression filter rejection-notch characteristics effects further discrimination of target echoes from reverberation, and wherein the reverberation suppression filter further serves as the reverberation frequency error detector to provide apparatus simplification, yet to yield improved effectiveness and stability of operation.

Obviously many modifications, variations and applications of the invention are possible in the light of the above teachings. It is therefore to be understood that, within the scope of the appended claims, the invention may be practiced otherwise than as specifically described herein.

What is claimed is:

1. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occurring at an unpredictable frequency within a comparatively wide frequency band substantially centered upon the reverberation mean frequency, a receiver circuit for effecting discrimination of target echoes from reverberation, said receiver circuit comprising: first filter means having a rejection notch characteristic centered upon the reverberation mean frequency, and of comparatively limited bandwidth substantially matching that of the major energy portion of said reverberation, for converting said receiver signal to a modified signal with strong attenuation of reverberation in only a correspondingly limited central portion of its frequency spectrum and without substantially affecting target echoes occurring at frequencies outside of said rejection notch; demodulator means for deriving from said modified signal a unipolar signal corresponding to the modulation envelope of said modified signal; and second filter means having a bandpass response characteristic with upper cutoff frequency substantially equal to half said limited bandwidth of the first filter means rejection notch, for isolating, from said unipolar signal, only such signal pulses as correspond to target echoes.

2. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occurring at an unpredictable frequency within a comparatively wide frequency band substantially centered upon the reverberation mean frequency, a receiver circuit for effecting discrimination of target echoes from reverberation, said receiver circuit comprising: own-doppler-nullifier means for setting the mean frequency of reverberation in said signal at a predetermined frequency value; first filter means having a rejection notch characteristic centered upon said predetermined frequency value and of comparatively limited bandwidth substantially matching that of the major energy portion of said reverberation, for converting said receiver signal to a modified signal with strong attenuation of reverberation in only a correspondingly limited central portion of its frequency spectrum and without substantially affecting target echoes occurring at frequencies outside of said rejection notch; demodulator means for deriving from said modified signal a unipolar signal corresponding to the modulation envelope of said modified signal; and second filter means having a bandpass response characteristic with the upper cutoff frequency substantially equal to half said limited bandwidth of the first filter means rejection notch, for isolating, from said unipolar signal, only such signal pulses as correspond to target echoes.

3. A receiver circuit as defined in claim 2, wherein said own-doppler-nullifier means includes said first filter means and is responsive to an error signal corresponding to deviation of the reverberation mean frequency from said predetermined value and derived from phase shift presented by reverberation in said modified signal.

4. In an underwater-target detection apparatus of the echo-ranging type wherein a receiver signal, resulting from transmission of search pulses, comprises reverberation and at times a target echo, said reverberation presenting a spread of frequencies, and said target echo occurring at an unpredictable frequency within a comparatively wide frequency band substantially centered upon the reverberation mean frequency, in combination: a search pulse transmitter; and a target echo receiver comprising own-doppler-nullifier means for setting the mean frequency of reverberation in said signal at a predetermined frequency value, and filter means having a rejection notch characteristic centered upon said predetermined frequency value and of comparatively limited bandwidth substantially matching that of the major energy portion of said reverberation frequency spread, for converting said receiver signal to a modified signal with strong attenuation of reverberation in only a correspondingly limited central portion of its frequency spectrum and without substantially affecting target echoes occurring at frequencies outside of said rejection notch, said own-doppler-nullifier means including means for deriving, from phase shift exhibited by reverberation in said modified signal, an error signal corresponding to deviation of the reverberation mean frequency from said predetermined value, and said own-doppler-nullifier means operating in response to said error signal to adjust the search pulse frequency in corrective manner resulting in substantially zero deviation of the reverberation mean frequency from said predetermined value.

5. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occuring at at uppredictable frequency within a comparatively wide frequency band substantially centered upon the reverberation mean frequency, in combination: a search pulse transmitter; and a target echo receiver comprising own-doppler-nullifier means for setting the mean frequency of reverberation in said signal at a predetermined frequency value, first filter means having a rejection notch characteristic centered upon said predetermined frequency value and of comparatively limited bandwidth substantially matching that of the major energy portion of said reverberation, for converting said receiver signal to a modified signal with strong attenuation of reverberation in only a correspondingly limited central portion of its frequency spectrum and without substantially affecting target echoes occurring at frequencies outside of said rejection notch, demodulator means for deriving from said modified signal a unipolar signal corresponding to the modulation envelope of said modified signal, and second filter means having a bandpass response characteristic with the upper cutoff frequently substantially equal to half said limited bandwidth of the first filter means rejection notch, for isolating, from said unipolar signal, only such signal pulses as correspond to target echoes, said own-doppler-nullifier means including means for deriving, from a phase shift exhibited by reverberation in said modified signal, an error signal corresponding to deviation of the reverberation mean frequency from said predetermined value, and said own-doppler-nullifier means operating in response to said error signal to adjust the search pulse frequency in a corrective manner resulting in substantially zero deviation of the reverberation mean frequency from said predetermined value.

6. In an underwater-target detection apparatus of the echo-ranging type wherein a receiver signal, resulting from transmission of search pulses, comprises reverberation and at times a target echo, said reverberation presenting a spread of frequencies, and said target echo occurring at an unpredictable frequency within a comparatively wide frequency band substantially centered upon the reverberation mean frequency, in combination: a search pulse transmitter including means for generating search pulses shaped to reduce said reverberation frequency spread to substantially minimum bandwidth; and a target echo receiver comprising filter means having a rejection notch characteristic centered upon the reverberation mean frequency and of comparatively limited bandwidth substantially matching that of the major energy portion of said reduced reverberation frequency spread, for converting said receiver signal to a modified signal with strong attenuation of reverberation in only a correspondingly limited central portion of its spread of frequencies and without substantially affecting target echoes occurring at frequencies outside of said rejection notch.

7. In an underwater-target detection apparatus of the echo-ranging type wherein a receiver signal, resulting from transmission of search pulses, comprises reverberation and at times a target echo, said reverberation presenting a spread of frequencies, and said target echo occurring at an unpredictable frequency within a comparatively wide frequency band substantially centered upon the reverberation mean frequency, in combination: a search pulse transmitter including means for generating search pulses shaped to reduce said reverberation frequency spread to substantially minimum bandwidth; and a target echo receiver comprising own-doppler-nullifier means for setting the mean frequency of reverberation in said signal at a predetermined frequency value, and filter means having a rejection notch characteristic centered upon said predetermined frequency value and of comparatively limited bandwidth substantially matching that of the major energy portion of said reduced reverberation frequency spread, for converting said receiver signal to a modified signal with strong attenuation of reverberation in only a correspondingly limited central portion of its spread of frequencies and without substantially affecting target echoes occurring at frequencies outside of said rejection notch.

8. A combination as defined in claim 7, wherein said own-doppler-nullifier means includes said filter means and is responsive to an error signal corresponding to deviation of the reverberation mean frequency from said predetermined value and derived from phase shift presented by reverberation in said modified signal.

9. A combination as defined in claim 7, wherein said own-doppler-nullifier means includes means for deriving, from phase shift presented by reverberation in said modified signal, an error signal corresponding to deviation of the reverberation mean frequency from said predetermined value, and wherein said own-doppler-nullifier means operates in response to said error signal to adjust the search pulse frequency in corrective manner resulting in substantially zero deviation of the reverberation mean frequency from said predetermined value.

10. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occurring at an unpredictable frequency within a comparatively wide frequency band substantially centered upon the reverberation mean frequency, in combination: a search pulse transmitter including means for generating search pulses shaped to reduce said reverberation frequency spectrum to substantially minimum bandwidth; and a target echo receiver comprising first filter means having a rejection notch characteristic centered upon the reverberation mean frequency, and of comparatively limited bandwidth substantially matching that of the major energy portion of said reverberation, for converting said receiver signal to a modified signal with strong attenuation of reverberation in only a correspondingly limited central portion of its frequency spectrum and without substantially affecting target echoes occurring at frequencies outside of said rejection notch, demodulator means for deriving from said modified signal a unipolar signal corresponding to the modulation envelope of said modified signal, and second filter means having a bandpass response characteristic with an upper cutoff frequency substantially equal to half said limited bandwidth of the first filter means rejection notch, for isolating, from said unipolar signal, only such signal pulses as correspond to target echoes.

11. In an underwater-target detection apparatus of the echo-ranging type wherein a receiver signal, resulting from transmission of search pulses, comprises reverberation and at times a target echo, said reverberation presenting a frequency spectrum of greater bandwidth than said target echo and presenting an amplitude-modulation envelope generally including pulses of character similar to said search pulses, and said target echo occurring at an unpredictable frequency within a comparatively wide frequency band substantially centered upon the reverberation mean frequency, in combination: a search pulse transmitter, including means for generating search pulses shaped to reduce said reverberation frequency spectrum to substantially minimum bandwidth; and a target echo receiver comprising own-doppler-nullifier means for setting the mean frequency of reverberation in said signal at a predetermined frequency value, first filter means having a rejection notch characteristic centered upon said predetermined frequency value and of comparatively limited bandwidth substantially matching that of the major energy portion of said reverberation for converting said receiver signal to a modified signal with strong attenuation of reverberation in only a correspondingly limited central portion of its frequency spectrum and without substantially affecting target echoes occurring at frequencies outside of said rejection notch, demodulator means for deriving from said modified signal a unipolar signal corresponding to the modulation envelope of said modified signal, and second filter means having a bandpass response characteristic with an upper cutoff frequency substantially equal to half said limited bandwidth of the first filter means rejection notch, for isolating, from said unipolar signal, only such signal pulses as correspond to target echoes.

12. A combination as defined in claim 11, wherein said own-doppler-nullifier means includes said first filter means and is responsive to an error signal corresponding to deviation of the reverberation mean frequency from said predetermined value and derived from phase shift presented by reverberation in said modified signal.

13. A combination as defined in claim 11, wherein said own-doppler-nullifier means includes means for deriving, from phase shift presented by reverberation in said modified signal, an error signal corresponding to deviation of the reverberation mean frequency from said predetermined value, and wherein said own-doppler-nullifier means operates in response to said error signal to adjust the search pulse frequency in corrective manner resulting in substantially zero deviation of the reverberation mean frequency from said predetermined value.

* * * * *